United States Patent

Overby, Jr. et al.

(10) Patent No.: US 9,781,162 B2
(45) Date of Patent: Oct. 3, 2017

(54) PREDICTIVE GENERATION OF A SECURITY NETWORK PROTOCOL CONFIGURATION

(75) Inventors: Linwood H. Overby, Jr., Raleigh, NC (US); Mark T. Wright, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 2722 days.

(21) Appl. No.: 11/354,360

(22) Filed: Feb. 15, 2006

(65) Prior Publication Data

US 2007/0189307 A1  Aug. 16, 2007

(51) Int. Cl.
H04L 12/28 (2006.01)
H04L 29/06 (2006.01)

(52) U.S. Cl.
CPC ............ H04L 63/20 (2013.01); H04L 63/164 (2013.01)

(58) Field of Classification Search
CPC ....................................................... H04L 29/06
USPC .................. 709/220, 224; 726/2; 703/13, 1; 713/156, 188; 370/389; 714/712
See application file for complete search history.

(56) References Cited

U.S. PATENT DOCUMENTS

| 6,282,678 | B1* | 8/2001 | Snay et al. ..................... 714/712 |
| 6,430,526 | B1* | 8/2002 | Toll .................................. 703/1 |
| 6,996,510 | B1* | 2/2006 | Reilly et al. .................... 703/13 |
| 7,191,229 | B2* | 3/2007 | Edmondson ................... 709/224 |
| 2002/0016926 | A1 | 2/2002 | Nguyen et al. |
| 2002/0099929 | A1 | 7/2002 | Choo |
| 2002/0188701 | A1* | 12/2002 | Brown et al. ................. 709/220 |
| 2003/0005328 | A1 | 1/2003 | Grewal et al. |
| 2003/0135753 | A1 | 7/2003 | Batra et al. |
| 2003/0140131 | A1* | 7/2003 | Chandrashekhar et al. .. 709/223 |
| 2004/0261116 | A1* | 12/2004 | Mckeown et al. ............ 725/109 |
| 2004/0268121 | A1 | 12/2004 | Shelest et al. |
| 2005/0076228 | A1* | 4/2005 | Davis et al. ................... 713/188 |
| 2005/0091527 | A1 | 4/2005 | Swander et al. |
| 2005/0165953 | A1 | 7/2005 | Oba et al. |
| 2005/0257039 | A1 | 11/2005 | Marshall |
| 2006/0002388 | A1* | 1/2006 | Grebus et al. ................. 370/389 |
| 2006/0129804 | A1* | 6/2006 | Satkunanathan et al. .... 713/156 |

(Continued)

OTHER PUBLICATIONS

Mohan, Raj, et al; *An Editor for Adaptive XML-Based Policy Management of IPSec*; Proceedings of the 19th Annual Computer Security Applications Conference; IEEE, 2003.

(Continued)

*Primary Examiner* — Christopher R Crompton
(74) *Attorney, Agent, or Firm* — Steven M. Greenberg, Esq.; CRGO Law

(57) ABSTRACT

A method, system and computer program product for predictively configuring a security services protocol implementation can be provided. The method can include providing a set of network topology descriptions and determining a selection of one of the network topology descriptions. The method further can include identifying configuration settings corresponding to the selection and applying the configuration settings to the security services protocol implementation. For instance, applying the configuration settings to the security services protocol implementation can include selecting encapsulation mode and routing settings for the security services protocol implementation.

24 Claims, 2 Drawing Sheets

(56) References Cited

U.S. PATENT DOCUMENTS

2007/0028175 A1* 2/2007 Moore et al. ............... 715/733
2007/0107043 A1* 5/2007 Newstadt et al. ............... 726/2
2008/0216006 A1* 9/2008 Jordan et al. ............... 715/771

OTHER PUBLICATIONS

Shue, Craig, et al; *Analysis of EPSec Overheads for PN Servers*; 0-7803-9427; IEEE, 2005.
Sullivan, John A., "ISCS Pre-Alpha Release Announcement," Aug. 23, 2004, https://lists.strongswan.org/pipermail/users/2004-August/000264.html.
"Integrated Secure Communications System," http://iscs.sourceforge.net/.

\* cited by examiner

PREDICTIVE GENERATION OF A SECURITY NETWORK PROTOCOL CONFIGURATION

BACKGROUND OF THE INVENTION

Field of the Invention

The present invention relates computer internetworking and more particularly to the field of network protocol implementation configuration.

Description of the Related Art

Computing devices alone have proven to be useful tools to billions globally; however, the interconnection of computing devices in computing networks has provided a level of utility orders of magnitude in excess of the stand alone computing device. The basic computer network has been uniformly enabled through the implementation of the transport control protocol/internet protocol (TCP/IP). Conforming implementations of TCP/IP form the very heart of the global Internet across which trillions of packets of information flow each day.

Modern advances in computer internetworking rely upon a multiplicity of highly complex protocols, each serving a particular purpose. Substantially attention has been paid recently to security protocol implementations that provide a high level of secure network communications. Security protocol implementations generally include mechanisms for authenticating the identity of communicants to a session and the negotiation of encryption keys for securing data transmitted therebetween. Security protocol implementations further provide means for exchanging encrypted data and for decrypting the data when required. Finally, security protocol implementations often provide infrastructure and processes enabled to pass secure data deep into a secure network without compromising or exposing the identity of one or both of the communicants to outside parties. Examples include Internet Protocol (IP) Security (IPSec) and transport layer security (TLS).

Security protocol implementations, like the implementation of many other network services protocols, often originate from a uniformly adopted protocol. In many cases, the uniformly adopted protocol persists in the form of an industry standard. Notwithstanding, implementations of uniformly adopted protocols can vary for different platforms such that users in many cases must recognize the implementation details of each implementation. Given the varying implementations of different network services protocols, configuring a computer network for interoperability across multiple different computing platforms utilizing one or more common network services can be challenging.

In particular, Internet security protocol implementations generally can be quite complicated to configure. The complexity in configuring an Internet security protocol implementation can arise from the number of protocol options available for configuration, as well as the number of permitted configuration topologies. In many cases, not only must data endpoints be defined, but also security endpoints must be defined. To that end, different security modes can be selected including tunnel mode and transport mode in the case of IPSec. Yet further, in an IPSec security protocol framework, security protocol implementations including authentication header (AH), encapsulated security payload (ESP) and Internet key exchange (IKE) require the definition of filter rules to permit IPSec traffic.

BRIEF SUMMARY OF THE INVENTION

Embodiments of the present invention address deficiencies of the art in respect to security protocol configuration and provide a novel and non-obvious method, system and computer program product for predictively configuring a security protocol implementation. In one embodiment, a security protocol configuration system can be provided. The tool can include a platform specific configuration builder configured to produce a platform specific configuration of a security protocol implementation. The tool further can include a set of topology descriptions. Finally, in a preferred aspect of the embodiment, the tool can include a configuration wizard, coupled to the set of topology descriptions. The wizard can include program code enabled to configure settings for the security protocol implementation corresponding to a selected one of the topology descriptions.

In another embodiment, a method for predictively configuring a security protocol implementation can be provided. The method can include providing a set of network topology descriptions and determining a selection of one of the network topology descriptions. The method further can include identifying configuration settings corresponding to the selection and applying the configuration settings to the security protocol implementation. For instance, applying the configuration settings to the security protocol implementation can include selecting encapsulation mode and routing settings for the network services protocol implementation.

In one aspect of the embodiment, the method yet further can include receiving a configuration request and determining from the configuration request whether a policy that requires IPSec dynamic security associations is to be configured. Responsive to determining from the configuration request that a policy for IPSec dynamic security associations is to be configured, a requirement map can be selected that is associated with a connectivity rule for the configuration request. Thereafter, a maximum level of encryption and authentication can be determined from the requirement map. Consequently, Internet Key Exchange (IKE) protocol settings can be configured according to the maximum level of encryption and authentication.

Notably, filter rules can be established so as to permit IP traffic to flow between data endpoints in a topology corresponding to the selection. As an example, establishing filter rules can include establishing at least one filter rule to ensure that IKE traffic flows between IKE daemons. As another example, establishing filter rules can include establishing at least one filter rule to ensure that IKE-Network Address Translation (NAT) traffic flows between IKE daemons. As yet another example, establishing filter rules can include establishing at least one filter rule to ensure that ESP packets are permitted to flow between security endpoints. Finally, as an even yet further example, establishing filter rules can include establishing at least one filter rule to ensure that AH packets are permitted to flow between security endpoints.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the predictive generation of a security protocol implementation configuration. In accordance with an embodiment of the present invention, a configuration wizard can be provided to facilitate in the configuration of a security protocol implementation such as IPSec responsive to inputs provided through a user interface for the wizard. In accordance with another embodiment of the present invention, a configuration batch processor can be provided to facilitate in the configuration of a security protocol responsive to batch processed inputs.

In the former circumstance, in the course of generating either a platform independent or platform specific configuration of a security protocol implementation, the configuration wizard can present a description of different network topologies. Responsive to the selection of a single one of the topologies, the configuration wizard can produce proper configuration data for the security protocol implementation configuration to account for the selected topology. Additionally, one or more filter rules can be generated to assure traffic flow between the nodes of the selected topology. In the latter circumstance, the selection of a topology can be provided as batch input to a batch processor.

Figure 1:
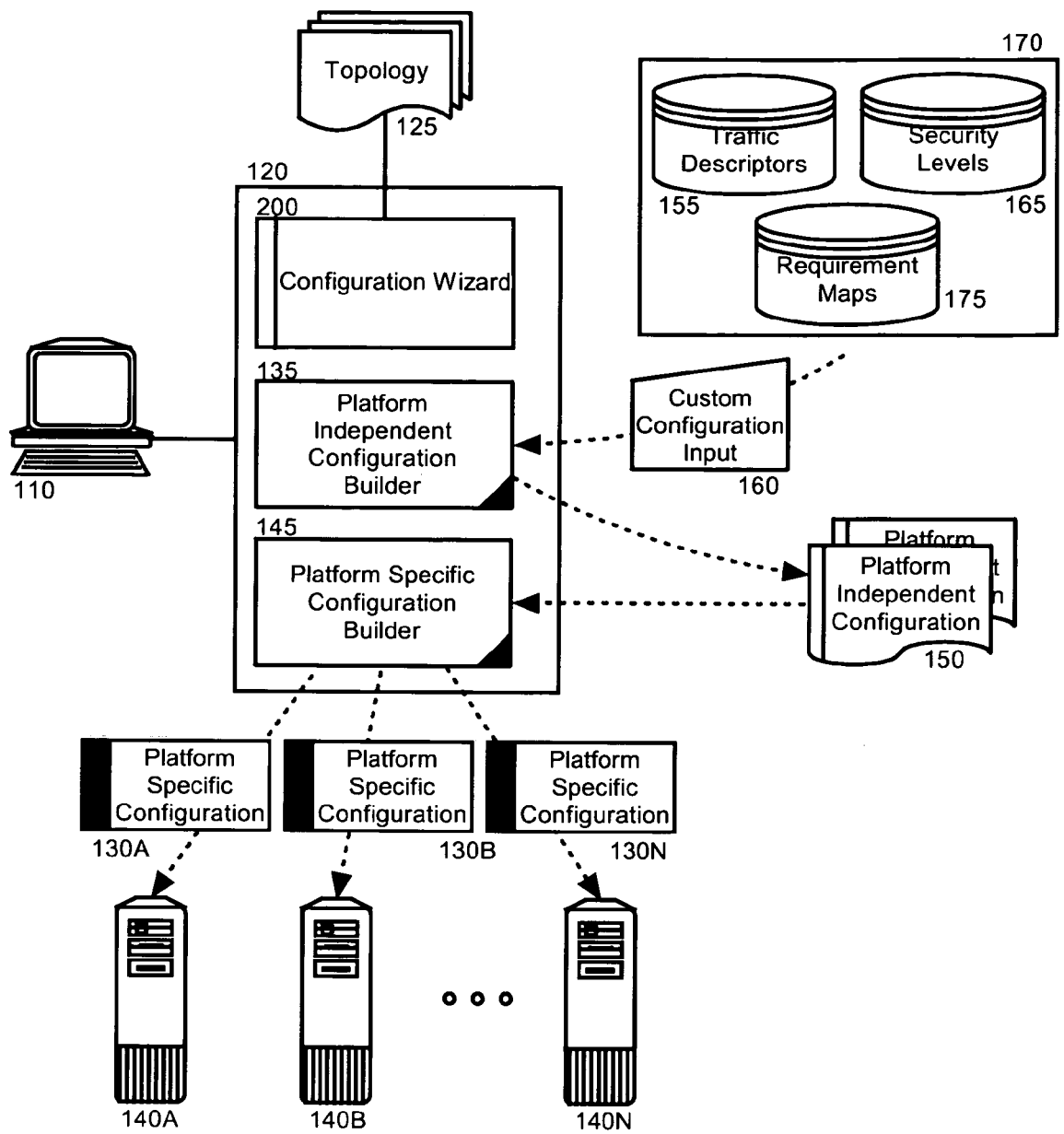
FIG. 1 is a schematic illustration of a platform independent configuration data processing system enabled for predictive generation of a security protocol implementation configuration; and, FIG. 2 is a flow chart illustrating a process for the predictive generation of a security protocol implementation configuration in the configuration wizard of FIG. 1.

In more particular illustration of a configuration wizard implementation, FIG. 1 is a schematic illustration of a data processing system incorporating a configuration wizard enabled for predictive generation of a security protocol implementation configuration. As shown in FIG. 1, the data processing system can be specifically arranged to generate a platform independent configuration of a security services protocol implementation. As used herein, a security services protocol implementation can include a programmatic implementation of a network security service such as IPSec and TLS.

As shown in FIG. 1, the data processing system can include an administrator workstation 110 coupled to a development tool 120. The development tool 120 can include a platform independent configuration builder 135 and a platform specific configuration builder 145 (though in an alternative embodiment of the invention, the development tool 120 can be arranged solely to include a platform specific configuration builder 145). The platform independent configuration builder 135 can include program code enabled to define one or more connectivity rules based upon customized configuration input 160.

The customized configuration input 160 can include one or more requirement maps 175, each of the requirement maps 175 associating one or more traffic descriptors 155 with corresponding security levels 165. The traffic descriptors 155 can be uniquely named and can contain the specific details of IP traffic such as the protocol type, local port identity and remote port identity. The security levels 165, in turn, can indicate a security technology such as IPSec or TLS and other security details such as crypto graphic cipher details.

Each of the requirement maps 175 can map at least one of the traffic descriptors 155 to a corresponding one of the security levels 165 in order to represent a repeatable connectivity pattern. In this way, the requirement maps 175 can be reusable configuration objects and can be used by multiple connectivity rules. As such, generally, the requirement maps 175, traffic descriptors 155 and security levels 165 can be stored in a data store of pre-configured reusable configuration objects 170. In this way, once configured, the requirement maps 175, traffic descriptors 155 and security levels 165 stored in the data store of pre-configured reusable configuration objects 170 can be reused as customized configuration input 160 in generating a platform independent configuration 150 for a security services protocol implementation.

The platform specific configuration builder 145 can include program code enabled to transform a platform independent configuration 150 for a security services protocol implementation into a platform specific configuration 130A, 130B, 130N for corresponding target nodes 140A, 140B, 140N in a computer communications network. In this regard, the program code of the platform specific configuration builder 145 can process the platform independent directives of the requirement maps 175, traffic descriptors 155 and security levels 165 in order to produce platform specific directives for a selected one of the target nodes 140A, 140B, 140N. Subsequently, the platform specific configurations 130A, 130B, 130N can be deployed to the target nodes 140A, 140B, 140N.

Notably, the development tool 120 can include a configuration wizard 200 enabled to facilitate in the configuration of a security protocol implementation such as IPSec based upon the selection of a particular network topology from among a set of different network topologies. Specifically, the configuration wizard 200 can provide a user interface through which different topology descriptions 125 can be provided to an end user. The different topology descriptions 125, by way of example, can include thumbnail images each representation of a network topology.

Upon selection of a particular one of the topology descriptions 125, a security configuration can be predictively generated corresponding to the selected one of the topology descriptions 125. In this regard, a suitable security configuration can be provided based upon pre-established, predictable best choices associated with the corresponding ones of the topology descriptions 125. The predictable best choices can be identified not only for selected ones of the topology descriptions 125, but also for encryption and authentication choices specified in an applicable one of the requirement maps 175. Finally, a set of filter rules can be established to allow for security protocol related traffic to flow between the nodes of the network topology implicated by the selected one of the topology descriptions 125.

Figure 2:
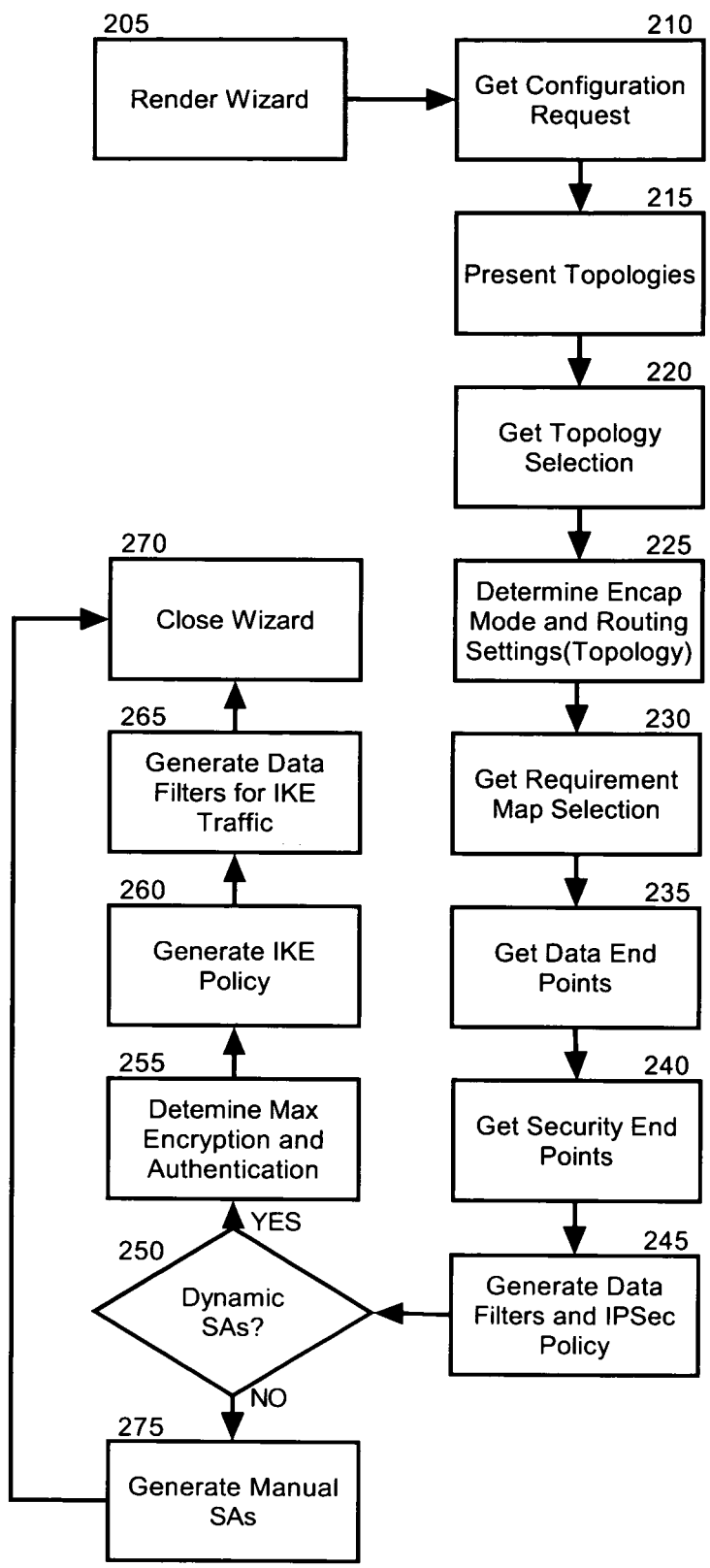

In further illustration, FIG. 2 is a flow chart illustrating a process for the predictive generation of a security protocol implementation configuration utilizing a configuration wizard. Beginning in block 205, the configuration wizard can be rendered for interaction with end users. In block 210, a configuration request can be received indicating a request to configure a security network protocol implementation such as IPSec. In block 215, the wizard can present a set of topology descriptions describing different known network topologies. In block 220, a selection through the wizard of one of the topology descriptions can be determined and in block 225 an encapsulation mode and routing settings can be determined which correspond to the selected topology descriptions.

In block 230, a requirement map can be identified that corresponds to a connectivity rule for the configuration request. If the requirement map is not available, a requirement map can be created for the connectivity rule. In block 235, data end points for the traffic descriptors of the requirement map can be determined and the security end points can be determined from the selected topology description in block 240. In block 245, data filters can be generated to ensure the flow of security protocol traffic between the end points. To this end, if IPSec security associations (SAs) are used in the connectivity rule, configuration settings can be generated to ensure that ESP encryption packets are permitted to flow between security endpoints. Likewise, if AH authentication is used in conjunction with IPSec SAs, configuration settings can be established to ensure that AH packets are permitted to flow between the security endpoints. Additionally, the IPSec policy can be generated for the encapsulation mode and routing settings. Thereafter, the process can continue in decision block 250.

In decision block 250, it can be determined whether dynamic SAs are to be utilized as part of the security protocol implementation. If not, manual SAs can be generated in block 275. Otherwise, in block 255 the requirement map can be examined to determine the highest level of desired encryption and authentication expressed within the requirement map. In block 260, the IKE connectivity settings and security levels can be selected for an IKE policy based upon the determined level of encryption and authentication expressed within the requirement map. Notably, prior to generating IKE rules for the selected IKE connectivity settings and security levels, the settings of the connectivity rule can be compared to the settings of other connectivity rules for the host protocol stack in the host system image to detect inherently conflicting IKE connectivity settings across different connectivity rules. Accordingly, once the IKE rules have been generated, correct IKE connectivity settings and security levels can be assured.

Thereafter, in block 265 one or more data filter rules can be established for the cryptographic requirements of the configurations for the IPSec SAs. In this regard, the filter rules can be established so as to permit IP traffic to flow between security endpoints in a specified topology. To that end, if IPSec dynamic security associations are used in the connectivity rule, configuration settings can be generated to ensure that traffic between IKE daemons will be allowed to flow. Additionally, if network address translation (NAT) is used in conjunction with IPSec dynamic security associations, configuration settings can be generated to ensure that IKE-NAT traffic can flow between the IKE daemons.

In any event, once filter rules have been generated in block 265, in block 270, the wizard can be closed. Importantly, it will be recognized by the skilled artisan that the predictive configuration of the security protocol implementation can increase the likelihood that the network protocol implementation is configured properly by matching best fitting configuration settings for a selected security protocol implementation according to a specified topology description.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A security services implementation protocol configuration data processing computer hardware system comprising:

a platform specific configuration builder executing in a memory of a computer, the platform specific configuration builder comprising program code enabled to produce a platform specific configuration of a security services protocol implementation including a programmatic implementation of a network security service including one of Internet Protocol Security (IPSec) and transport layer security (TLS);

a set of network topology descriptions, each network topology description comprising a thumbnail image representing a different network topology; and, a configuration tool executing in the memory of the computer and coupled to the set of network topology descriptions, the configuration tool comprising program code enabled to receive a configuration request and to respond to the configuration request by:

displaying the set of network topology descriptions in the configuration tool, detecting a selection of one of the thumbnail images in the configuration tool, and configuring settings for the security services protocol implementation corresponding to a selected thumbnail image associated with one of the network topology descriptions and reflective of pre-established, predictable best choices both for the one of the network topology descriptions and also for encryption and authentication choices specified by a requirement map applicable for a connectivity rule for the configuration request.

2. The system of claim 1, further comprising
a platform independent configuration builder executing in the memory of the computer comprising program code enabled to produce a platform independent configuration of the security services protocol implementation from which the platform specific configuration builder produces the platform specific configuration of the security services protocol implementation.

3. The system of claim 1, wherein
the settings comprise Internet Key Exchange (IKE) settings and security levels.

4. The system of claim 1, wherein
the settings further comprise encapsulation mode and routing settings.

5. The system of claim 1, wherein
the program code of the configuration tool is further enabled to generate filter rules to permit traffic to flow between security endpoints in a topology corresponding to the selected one of the network topology descriptions.

6. The system of claim 1, wherein
the configuration tool is a configuration wizard.

7. A computer-implemented method for predictively configuring a security services protocol implementation, the method comprising:
receiving a configuration request; and,
responsive to the configuration request:
displaying a set of network topology descriptions in a graphical user interface, each network topology description comprising a thumbnail image representing a different network topology;
detecting a selection of one of the thumbnail images in the graphical user interface;
determining, by a data processing computer hardware system, which thumbnail image had been selected;
identifying, by the data processing computer hardware system, configuration settings corresponding to the selection of the thumbnail image associated with one of the network topology descriptions and reflective of pre-established, predictable best choices both for the one of the network topology descriptions and also for encryption and authentication choices specified by a requirement map applicable for a connectivity rule for the configuration request; and,
applying the configuration settings to the security services protocol implementation producing a programmatic implementation of a network security service including one of Internet Protocol Security (IPSec) and transport layer security (TLS).

8. The method of claim 7, further comprising:
determining from the configuration request whether a policy requiring Internet protocol security (IPSec) dynamic security associations is to be configured; and,
responsive to determining from the configuration request that a policy requiring IPSec dynamic security associations is to be configured, determining from the requirement map a maximum level of encryption and authentication, and configuring Internet Key Exchange (IKE) according to the maximum level of encryption and authentication.

9. The method of claim 7, wherein
applying the configuration settings to the security services protocol implementation, comprises selecting encapsulation mode and routing settings for the security services protocol implementation.

10. The method of claim 7, further comprising
establishing filter rules to permit Internet Protocol (IP) traffic to flow between data endpoints in a topology corresponding to the selection of one of the network topology descriptions.

11. The method of claim 10, wherein
establishing filter rules comprises establishing at least one filter rule to ensure that Internet Key Exchange (IKE) traffic flows between IKE daemons.

12. The method of claim 10, wherein
establishing filter rules comprises establishing at least one filter rule to ensure that Internet Key Exchange (IKE)-Network Address Translation (NAT) traffic flows between IKE daemons.

13. The method of claim 10, wherein
establishing filter rules comprises establishing at least one filter rule to ensure that encapsulated security payload (ESP) packets are permitted to flow between security endpoints.

14. The method of claim 10, wherein
establishing filter rules comprises establishing at least one filter rule to ensure that authentication handler (AH) packets are permitted to flow between security endpoints.

15. The method of claim 8, wherein
identifying configuration settings corresponding to the selection of one of the network topology descriptions, comprises determining security end points for end-to-end traffic implicated by the selection of one of the network topology descriptions.

16. A computer program product comprising a computer usable storage medium having stored therein computer usable program code for predictively configuring a security services protocol implementation, wherein the computer usable storage medium is not a transitory signal per se, the computer usable program code, which when executed on a computer hardware system, causing the computer hardware system to perform
receiving a configuration request; and,
responsive to the configuration request:
displaying a set of network topology descriptions in a graphical user interface, each network topology description comprising a thumbnail image representing a different network topology;
detecting a selection of one of the thumbnail images in the graphical user interface;
determining which thumbnail image had been selected;
identifying configuration settings corresponding to the selection of the thumbnail image associated with one of the network topology descriptions and reflective of pre-established, predictable best choices both for the one of the network topology descriptions and also for encryption and authentication choices specified by a requirement map applicable for a connectivity rule for the configuration request; and
applying the configuration settings to the security services protocol implementation producing a programmatic implementation of a network security service including one of Internet Protocol Security (IPSec) and transport layer security (TLS).

17. The computer program product of claim 16, further comprising:
determining from the configuration request whether a policy requiring Internet protocol security (IPSec) dynamic security associations is to be configured; and upon determining that the policy requiring IPSec dynamic security associations is to be configured,
  determining from the requirement map a maximum level of encryption and authentication, and configuring
  Internet Key Exchange (IKE) according to the maximum level of encryption and authentication.

18. The computer program product of claim 16, wherein applying comprises selecting encapsulation mode and routing settings for the security services protocol implementation.

19. The computer program product of claim 16, further comprising
  establishing filter rules to permit Internet Protocol (IP) traffic to flow between data endpoints in a topology corresponding to the selection of one of the network topology descriptions.

20. The computer program product of claim 19, wherein at least one filter rule is established during establishing the filter rules to ensure that Internet Key Exchange (IKE) traffic flows between IKE daemons.

21. The computer program product of claim 19, wherein at least one filter rule is established during establishing the filter rules to ensure that Internet Key Exchange (IKE)-Network Address Translation (NAT) traffic flows between IKE daemons.

22. The computer program product of claim 19, wherein at least one filter rule is established during establishing the filter rules to ensure that encapsulated security payload (ESP) packets are permitted to flow between security endpoints.

23. The computer program product of claim 19, wherein at least one filter rule is established during establishing the filter rules to ensure that authentication handler (AH) packets are permitted to flow between security endpoints.

24. The computer program product of claim 16, wherein identifying configuration settings corresponding to the selection of one of the network topology descriptions comprises determining security end points for end-to-end traffic implicated by the selection of one of the network topology descriptions.

* * * * *